(12) United States Patent
Thomas

(10) Patent No.: US 12,453,931 B2
(45) Date of Patent: *Oct. 28, 2025

(54) COMPOSITIONS FOR LOW-TEMPERATURE DISTILLATION OF HIGH-BOILING-POINT MOLECULES

(71) Applicant: NATURAL EXTRACTION SYSTEMS, LLC, Boulder, CO (US)

(72) Inventor: C. Russell Thomas, Boulder, CO (US)

(73) Assignee: Natural Extraction Systems, LLC, Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/553,182

(22) PCT Filed: Apr. 1, 2022

(86) PCT No.: PCT/US2022/023140
§ 371 (c)(1),
(2) Date: Sep. 28, 2023

(87) PCT Pub. No.: WO2022/212898
PCT Pub. Date: Oct. 6, 2022

(65) Prior Publication Data
US 2024/0189737 A1  Jun. 13, 2024

Related U.S. Application Data

(60) Provisional application No. 63/250,863, filed on Sep. 30, 2021, provisional application No. 63/250,917, filed on Sep. 30, 2021, provisional application No. 63/173,196, filed on Apr. 9, 2021, provisional application No. 63/170,308, filed on Apr. 2, 2021.

(51) Int. Cl.
| | | |
|---|---|---|
| *B01D 11/02* | (2006.01) | |
| *B01D 5/00* | (2006.01) | |
| *C07C 45/78* | (2006.01) | |
| *C11B 9/02* | (2006.01) | |
| *B01D 11/00* | (2006.01) | |

(52) U.S. Cl.
CPC ............. *B01D 5/006* (2013.01); *B01D 11/02* (2013.01); *B01D 11/0253* (2013.01); *C07C 45/78* (2013.01); *C11B 9/027* (2013.01); *B01D 2011/007* (2013.01)

(58) Field of Classification Search
CPC ........... C02F 1/04–20; C07C 45/78–86; B01D 11/02–0296; B01D 2011/007
See application file for complete search history.

(56) References Cited

U.S. PATENT DOCUMENTS

| | | | | |
|---|---|---|---|---|
| 2,820,744 A | * | 1/1958 | Lighter | .............. C02F 1/18 |
| | | | | 203/DIG. 1 |
| 4,201,596 A | * | 5/1980 | Church | .............. C13K 1/02 |
| | | | | 435/165 |
| 4,529,699 A | * | 7/1985 | Gerez | .............. C13K 1/02 |
| | | | | 435/165 |
| 8,939,388 B1 | * | 1/2015 | Beetz | .............. B05B 5/03 |
| | | | | 239/690 |
| 10,822,320 B2 | * | 11/2020 | Thomas | .............. C07D 311/78 |
| 10,968,191 B2 | * | 4/2021 | Marckmann | ....... B01D 11/0223 |
| 11,643,402 B2 | * | 5/2023 | Thomas | .............. C07C 29/80 |
| | | | | 549/388 |
| 2007/0000769 A1 | | 1/2007 | Brown | |
| 2010/0137652 A1 | | 6/2010 | Tirtowidjojo et al. | |
| 2015/0239828 A1 | | 8/2015 | Gajda et al. | |
| 2015/0352463 A1 | | 12/2015 | Grave et al. | |
| 2020/0048214 A1 | * | 2/2020 | Thomas | .............. C07C 67/08 |
| 2020/0048215 A1 | * | 2/2020 | Thomas | .............. B01D 17/06 |
| 2023/0076088 A1 | * | 3/2023 | Thomas | .............. C07D 311/80 |

OTHER PUBLICATIONS

Ernst et al., "How are vapor pressure and boiling point related?", Jan. 12, 2014, socratic.org, URL: https://socratic.org/questions/how-are-vapor-pressure-and-boiling-point-related.*
"Clouds", National Oceanic and Atomposheric Administration (NOAA), Jul. 28, 2023, https://www.noaa.gov/jetstream/clouds.*
"How Clouds Form", National Oceanic and Atomposheric Administration (NOAA), Mar. 28, 2023, URL: https://www.noaa.gov/jetstream/clouds/how-clouds-form.*
"Cloud Droplet Size Distributions", The Cloud Physics Group, URL: https://adele.faculty.ucdavis.edu/research/projects/cloud-dsd/.*

* cited by examiner

*Primary Examiner* — Jonathan Luke Pilcher
(74) *Attorney, Agent, or Firm* — Douglas G. Metcalf

(57) ABSTRACT

Various aspects of this disclosure relate to a composition, comprising a gas phase and a condensed phase, wherein the gas phase comprises a molecule; the condensed phase comprises the molecule; the gas phase has a temperature and a pressure; the molecule has a boiling point at the pressure of the gas phase; the boiling point of the molecule is less than the temperature of the gas phase; the molecule has a vapor pressure at the temperature of the gas phase; the vapor pressure of the molecule is less than the pressure of the gas phase; the condensed phase consists of one or both of a solid phase and a liquid phase; the condensed phase is suspended in the gas phase; and the condensed phase has a surface-area-to-volume ratio of at least 500 per meter.

4 Claims, No Drawings

COMPOSITIONS FOR LOW-TEMPERATURE DISTILLATION OF HIGH-BOILING-POINT MOLECULES

CROSS-REFERENCE TO RELATED APPLICATIONS

This is a national phase application of International Application No. PCT/US2022/023140, filed Apr. 1, 2022, which claims priority to U.S. Provisional Patent Application No. 63/170,308, filed Apr. 2, 2021; U.S. Provisional Patent Application No. 63/173,196, filed Apr. 9, 2021; U.S. Provisional Patent Application No. 63/250,863, filed Sep. 30, 2021; and U.S. Provisional Patent Application No. 63/250,917, filed Sep. 30, 2021, each of which is incorporated by reference in its entirety.

BACKGROUND

Natural product extraction is a mature technical field. The last major innovation was the development of supercritical fluid extraction in the 1980's. An oligopoly of a few major flavor and fragrance companies achieved economies of scale and global footprints. Their products became commoditized and fungible, which forced cost-cutting and tight profit margins.

Many "current" good manufacturing practices are becoming anachronistic as the global supply chain increasingly demands sustainable agriculture, fair trade, and organic certification. Regulators and consumers increasingly pressure the ingredients industries, and newsworthy publications suggest that new regulations may inadvertently end the economically-viable production of several key ingredients used in everyday consumer packaged goods.

A new extraction technology that could increase profit margins without reliance upon disfavored manufacturing practices could allow flavor and fragrance companies to absorb the cost of additional regulation and save the global supply of ingredients that currently require manufacturing methods that may not remain tenable in the years to come.

SUMMARY

Various aspects of this disclosure relate to the discovery that converting a solid or a liquid into an aerosol allows the distillation of molecules from the aerosol in seconds at temperatures that are significantly less than the boiling points of the molecules. This discovery extends beyond aerosols to many compositions that have large surface-area-to-volume ratios.

DETAILED DESCRIPTION

Various aspects of this disclosure relate to a composition, comprising a gas phase and a condensed phase, wherein: the gas phase comprises a molecule; the condensed phase comprises the molecule; the gas phase has a temperature and a pressure; the molecule has a boiling point at the pressure of the gas phase; the boiling point of the molecule is greater than the temperature of the gas phase; the molecule has a vapor pressure at the temperature of the gas phase; the vapor pressure of the molecule is less than the pressure of the gas phase; the condensed phase consists of one or both of a solid phase and a liquid phase; the condensed phase is suspended in the gas phase; and the condensed phase has a surface-area-to-volume ratio of at least 500 per meter.

"Comprising" refers to an open set, for example, such that a gas phase that comprises a molecule can also comprise a second molecule.

"Consists" refers to a closed set, for example, such that a condensed phase that consists of one or both of a solid phase and a liquid phase cannot also comprise a plasma phase.

"Condensed phase" refers to "one or both of a solid phase and a liquid phase" without limitation, and "condensed phase" shall not be interpreted as implying that any or all of the condensed phase originated from a gas phase that condensed except as explicitly set forth in this disclosure.

In some embodiments, the composition has a vaporization rate for conversion of the molecule in the condensed phase into the molecule in the gas phase; the composition has a condensation rate for conversion of the molecule in the gas phase into the molecule in the condensed phase; the composition has a mass transfer rate, which is equal to the vaporization rate minus the condensation rate; and the mass transfer rate is a positive number.

In some embodiments, the mass transfer rate is at least 5 micrograms of the molecule per gram of the composition per second. In some embodiments, the mass transfer rate is at least 5 micrograms of the molecule per gram of the condensed phase per second. In some embodiments, the mass transfer rate is at least 5 micrograms of the molecule per gram of the gas phase per second.

In some embodiments, the temperature of the gas phase is at least 25 degrees Celsius.

In some embodiments, the temperature of the gas phase is no greater than 250 degrees Celsius.

In some embodiments, the temperature of the gas phase is greater than 100 and no greater than 235 degrees Celsius.

In some embodiments, the condensed phase has a temperature that is less than the temperature of the gas phase.

In some embodiments, the composition has a nonzero rate of sensible heat transfer from the gas phase to the condensed phase.

In some embodiments, the composition has a rate of sensible heat transfer from the gas phase to the condensed phase of at least 2 joules per gram of the condensed phase per second. In some specific embodiments, the composition has a rate of sensible heat transfer from the gas phase to the condensed phase of at least 20 joules per gram of the condensed phase per second.

In some embodiments, the composition has a rate of sensible heat transfer from the gas phase to the condensed phase of no greater than 20 kilojoules per gram of the condensed phase per second. In some specific embodiments, the composition has a rate of sensible heat transfer from the gas phase to the condensed phase of no greater than 2 kilojoules per gram of the condensed phase per second.

In some embodiments, the composition has a nonzero rate of latent heat transfer between the gas phase and the condensed phase. In some specific embodiments, the composition has a rate of latent heat transfer between the gas phase and the condensed phase of at least 10 millijoules per gram of the condensed phase per second. In some very specific embodiments, the composition has a rate of latent heat transfer between the gas phase and the condensed phase of at least 100 millijoules per gram of the condensed phase per second. In some specific embodiments, the composition has a rate of latent heat transfer between the gas phase and the condensed phase of no greater than 2 kilojoules per gram of the condensed phase per second. In some very specific embodiments, the composition has a rate of latent heat transfer between the gas phase and the condensed phase of no greater than 200 joules per gram of the condensed phase per second.

In some embodiments, the gas phase has a pressure of at least 0.1 and no greater than 100 atmospheres. In some specific embodiments, the gas phase has a pressure of at least 0.5 and no greater than 2 atmospheres. In some very specific embodiments, the gas phase has a pressure of at least 0.75 and no greater than 1.25 atmospheres.

In some embodiments, the composition has an altitude; the altitude has an atmospheric pressure; and the pressure of the gas phase is greater than the atmospheric pressure at the altitude.

In some embodiments, the condensed phase has a surface-area-to-volume ratio of at least 1000 per meter. In some specific embodiments, the condensed phase has a surface-area-to-volume ratio of at least 2400 per meter. In some even more specific embodiments, the condensed phase has a surface-area-to-volume ratio of at least 5000 per meter. In some very specific embodiments, the condensed phase has a surface-area-to-volume ratio of at least 10,000 per meter.

In some embodiments, the condensed phase has an average particle size of no greater than 5 millimeters. In some specific embodiments, the condensed phase has an average particle size of no greater than 500 micrometers.

"Particle size" refers to the longest linear distance that connects one point of a particle of the composition to another point of the particle in three-dimensional Euclidean space.

In some embodiments, the condensed phase has an average terminal velocity of no greater than 5 meters per second in still, dry air at 1 atmosphere of pressure. In some specific embodiments, the condensed phase has an average terminal velocity of no greater than 1 meter per second in still, dry air at 1 atmosphere of pressure.

In some embodiments, the composition has a turbulent flow.

In some embodiments, the composition has an average Reynolds number that is greater than 100. In some specific embodiments, the composition has an average Reynolds number that is greater than 1000. In some very specific embodiments, the composition has an average Reynolds number that is greater than 10,000.

In some embodiments, the composition has an average Reynolds number that is no greater than 1,000,000.

In some embodiments, the composition has an average drag coefficient of at least 0.5.

In some embodiments, the composition has a laminar flow.

In some embodiments, the composition has an average velocity of at least 100 millimeters per second. In some specific embodiments, the composition has an average velocity of at least 1 meter per second.

In some embodiments, the composition has an average kinetic energy of at least 5 microjoules per gram of the composition. In some specific embodiments, the composition has an average kinetic energy of at least 500 microjoules per gram of the composition.

In some embodiments, the composition has an average kinetic energy of no greater than 50 joules per gram of the composition. In some specific embodiments, the composition has an average kinetic energy of no greater than 5 joules per gram of the composition.

In some embodiments, the composition comprises at least 1 gram of the condensed phase per cubic meter of the gas phase.

In some embodiments, the composition comprises no greater than 1 gram of the condensed phase per liter of the gas phase.

In some embodiments, the composition comprises at least 2 micrograms of the molecule per gram of the condensed phase.

In some embodiments, the composition comprises no greater than 200 milligrams of the molecule per gram of the condensed phase.

In some embodiments, the composition comprises at least 2 micrograms of the molecule per gram of the gas phase.

In some embodiments, the composition comprises no greater than 200 milligrams of the molecule per gram of the gas phase.

In some embodiments, the gas phase comprises at least 10 percent of the molecule of the composition. In some specific embodiments, the gas phase comprises at least 25 percent of the molecule of the composition. In some very specific embodiments, the gas phase comprises at least 50 percent of the molecule of the composition.

In some embodiments, the gas phase comprises a greater percentage of the molecule than the condensed phase.

In some embodiments, the condensed phase comprises one or more polysaccharides, disaccharides, or monosaccharides. In some specific embodiments, the condensed phase comprises cellulose. In some very specific embodiments, the condensed phase comprises cellulose I.

In some embodiments, the condensed phase comprises dextrin.

In some embodiments, the condensed phase comprises pyrodextrin.

In some embodiments, the condensed phase comprises levoglucosan.

In some embodiments, the condensed phase comprises one or more proteins, peptides, or amino acids. In some specific embodiments, the condensed phase comprises one or more proteins that comprise amino acid sequences that encode a cellulose synthase.

In some embodiments, the condensed phase comprises one or more nucleic acids, nucleotides, or nucleobases. In some specific embodiments, the condensed phase comprises one or more nucleic acids that comprise nucleotide sequences that encode a cellulose synthase.

In some embodiments, the condensed phase comprises 1, 2, 3, 4, 5, or each of sodium ion ("Na+"), potassium ion ("K+"), calcium ion ("Ca++"), magnesium ion ("Mg++"), monohydrogen phosphate, and dihydrogen phosphate. In some specific embodiments, the condensed phase comprises monohydrogen phosphate and dihydrogen phosphate.

In some embodiments, the condensed phase comprises chlorophyll.

In some embodiments, the condensed phase comprises cells. In some specific embodiments, the condensed phase comprises cells, and each cell comprises a cell wall. In some very specific embodiments, the condensed phase comprises cells, and the cells are plant cells.

In some embodiments, the condensed phase comprises cells; the cells comprise intact cells that each comprise an intracellular space and an intact cell membrane that inhibits fluid communication between the intracellular space and the gas phase; and the cells comprise lysed cells that each comprise an intracellular space and a lysed cell membrane that allows fluid communication between the intracellular space and the gas phase.

In some embodiments, at least 10 percent of the cells are lysed cells. In some specific embodiments, at least 25 percent of the cells are lysed cells. In some very specific embodiments, at least 50 percent of the cells are lysed cells.

In some embodiments, the intracellular space of each intact cell comprises a volatile molecule; the volatile molecule has a boiling point at the pressure of the gas phase; and the boiling point of the volatile molecule at the pressure of the gas phase is less than the temperature of the gas phase.

In some embodiments, the intracellular space of each intact cell comprises a superheated liquid.

In some embodiments, the intracellular space of each intact cell comprises a gas.

In some embodiments, the intracellular space of each intact cell comprises water; the water has a boiling point at the pressure of the gas phase; and the boiling point of water at the pressure of the gas phase is less than the temperature of the gas phase.

In some embodiments, the intracellular space of each intact cell comprises superheated water.

In some embodiments, the intracellular space of each intact cell comprises water vapor.

In some embodiments, the intracellular space of each intact cell has a pressure that is greater than the pressure of the gas phase.

In some embodiments, the composition has a nonzero cell lysis rate for conversion of intact cells into lysed cells. In some specific embodiments, the composition has a cell lysis rate for conversion of intact cells into lysed cells; and the cell lysis rate is at least 1 percent of the cells per second. In some very specific embodiments, the composition has a cell lysis rate for conversion of intact cells into lysed cells; and the cell lysis rate is at least 10 percent of the cells per second. Cell lysis improves extraction efficiency by facilitating fluid communication between the intracellular space and the gas phase.

In some embodiments, the gas phase comprises one or more of molecular nitrogen, molecular oxygen, carbon dioxide, argon, neon, water vapor, and ethanol vapor. In some specific embodiments, the gas phase comprises one or more of the molecule, molecular nitrogen, molecular oxygen, carbon dioxide, argon, neon, water vapor, and ethanol vapor at a combined concentration of at least 50 percent by mass.

In some embodiments, the gas phase comprises molecular nitrogen. In some specific embodiments, the gas phase comprises the molecule and molecular nitrogen at a combined concentration of at least 50 percent by mass.

In some embodiments, the gas phase lacks water vapor at a concentration greater than 90 percent by mass. In some specific embodiments, the gas phase lacks water vapor at a concentration greater than 50 percent by mass. In some very specific embodiments, the gas phase lacks water vapor at a concentration greater than 10 percent by mass.

In some embodiments, the gas phase comprises dry steam. In some specific embodiments, the gas phase comprises the molecule and dry steam at a combined concentration of at least 50 percent by mass.

In some embodiments, the molecule is acetophenone (CAS: 98-86-2); alpha-bergamotol (CAS: 88034-74-6); alpha-bisabolol (CAS: 515-69-5); alpha-bisabolol oxide A (CAS: 22567-36-8); alpha-cadinol (CAS: 481-34-5); alpha-curcumene (CAS: 644-30-4); alpha-fenchene (CAS: 471-84-1); alpha-phellandrene (CAS: 99-83-2); alpha-pinene (CAS: 80-56-8); alpha-santalol (CAS: 115-71-9); alpha-terpinene (CAS: 99-86-5); alpha-terpineol (CAS: 98-55-5); alpha-terpinyl acetate (CAS: 80-26-2); alpha-thujene (CAS: 2867-05-2); alpha-thujone (CAS: 546-80-5); alpha-zingiberene (CAS: 495-60-3); azulene (CAS: 275-51-4); benzyl acetate (CAS: 140-11-4); benzyl benzoate (CAS: 120-51-4); bergamotene (CAS: 6895-56-3); beta-bisabolene (CAS: 495-61-4); beta-caryophyllene (CAS: 87-44-5); beta-damascenone (CAS: 23696-85-7); beta-eudesmol (CAS: 473-15-4); beta-farnesene (CAS: 77129-48-7); beta-phellandrene (CAS: 555-10-2); beta-pinene (CAS: 127-91-3); beta-santalol (CAS: 11031-45-1); beta-selinene (CAS: 17066-67-0); beta-sesquiphellandrene (CAS: 20307-83-9); beta-terpinene (CAS: 99-84-3); beta-terpinyl acetate (CAS: 10198-23-9); beta-thujene (CAS: 28634-89-1); beta-thujone (CAS: 1125-12-8); borneol (CAS: 464-45-9); bornyl acetate (CAS: 76-49-3); camphene (CAS: 79-92-5); camphor (CAS: 76-22-2); capsaicin (CAS: 404-86-4); carene (CAS: 13466-78-9); carvacrol (CAS: 499-75-2); carvone (CAS: 99-49-0); caryophyllene oxide (CAS: 1139-30-6); cedrene (CAS: 469-61-4); cedrol (CAS: 77-53-2); chamazulene (CAS: 529-05-5); chavicol (CAS: 501-92-8); cinnamaldehyde (CAS: 104-55-2); citral (CAS: 5392-40-5); citronellal (CAS: 106-23-0); citronellol (CAS: 106-22-9); citronellyl formate (CAS: 105-85-1); curzerene (CAS: 17910-09-7); cyclopentadecanolide (CAS: 106-02-5); decanal (CAS: 112-31-2); delta-guaiene (CAS: 3691-11-0); ethyl cinnamate (CAS: 103-36-6); eugenol (CAS: 97-53-0); farnesene (CAS: 502-61-4); farnesol (CAS: 4602-84-0); furanoeudesma-1,3-diene (CAS: 87605-93-4); furfural (CAS: 98-01-1); furfuryl acetate (CAS: 623-17-6); gamma-decalactone (CAS: 706-14-9); gamma-muurolene (CAS: 30021-74-0); gamma-nonalactone (CAS: 104-61-0); gamma-terpinene (CAS: 99-85-4); gamma-terpinyl acetate (CAS: 10235-63-9); geraniol (CAS: 106-24-1); geranyl acetate (CAS: 105-87-3); germacrene A (CAS: 28387-44-2); germacrene D (CAS: 37839-63-7); guaiacol (CAS: 90-05-1); heneicosane (CAS: 629-94-7); humulene (CAS: 6753-98-6); isoamyl benzoate (CAS: 94-46-2); kessane (CAS: 3321-66-2); limonene (CAS: 6876-12-6); linalool (CAS: 78-70-6); linalool oxide (CAS: 1365-19-1); linalyl acetate (CAS: 115-95-7); menthol (CAS: 89-78-1); menthone (CAS: 89-80-5); methyl cinnamate (CAS: 103-26-4); methyl eugenol (CAS: 93-15-2); methylpyrazine (CAS: 109-08-0); myrcene (CAS: 123-35-3); myristicin (CAS: 607-91-0); neral (CAS: 5392-40-5); nerol (CAS: 106-25-2); nerolidol (CAS: 7212-44-4); nookatone (CAS: 91416-23-8); nootkatin (CAS: 4431-03-2); nootkatol (CAS: 53643-07-5); nootkatone (CAS: 91416-23-8); ocimene (CAS: 7216-56-0); octanal (CAS: 124-13-0); para-cresol (CAS: 106-44-5); para-cymene (CAS: 99-87-6); patchouli alcohol (CAS: 5986-55-0); perillene (CAS: 539-52-6); phenylacetaldehyde (CAS: 122-78-1); phenylacetic acid (CAS: 103-82-2); phenylethyl alcohol (CAS: 60-12-8); phytol (CAS: 150-86-7); sabinene (CAS: 3387-41-5); safrole (CAS: 94-59-7); tau-muurolol (CAS: 19912-62-0); terpinen-4-ol (CAS: 562-74-3); terpinolene (CAS: 586-62-9); thymol (CAS: 89-83-8); valencene (CAS: 4630-07-3); vanillin (CAS: 121-33-5); zingerone (CAS: 122-48-5); zingiberenol (CAS: 58334-55-7); zingiberol (CAS: 6754-68-3); 1,8-cineole (CAS: 470-82-6); 1-phenylethyl acetate (CAS: 93-92-5); 2,6-dimethylpyrazine (CAS: 108-50-9); 2-furanmethanol (CAS: 98-00-0); 2-heptanol (CAS: 543-49-7); 2-heptanone (CAS: 110-43-0); 2-heptyl acetate (CAS: 5921-82-4); 2-methoxy-4-vinylphenol (CAS: 7786-61-0); 2-methyl-3-buten-2-ol (CAS: 115-18-4); 2-methylbutanoic acid (CAS: 116-53-0); 2-nonanone (CAS: 821-55-6); 2-pentanol (CAS: 6032-29-7); 2-pentyl acetate (CAS: 626-38-0); 2-phenylethyl alcohol (CAS: 60-12-8); 2-undecanone (CAS: 112-12-9); 3-methylbutanoic acid (CAS: 503-74-2); 3-phenylpropanoic acid (CAS: 501-52-0); 4-methylguaiacol (CAS: 93-51-6); 5-methylfurfural (CAS: 620-02-0); 6-gingerol (CAS: 23513-14-6); 6-methyl-5-hepten-2-one (CAS: 110-93-0); or 6-shogaol (CAS: 555-66-8).

In some embodiments, the molecule is phenylacetaldehyde oxime (CAS: 7028-48-0).

In some embodiments, the molecule is dihydrofarnesal (CAS: 32480-08-3).

In some embodiments, the molecule is not a cannabinoid carboxylic acid, tetrahydrocannabinolic acid, tetrahydrocannabivarin carboxylic acid, tetrahydrocannabiorcolic acid, cannabidiolic acid, cannabidivarin carboxylic acid, cannabidiorcolic acid, cannabichromenic acid, cannabichromevarinic acid, cannabigerolic acid, cannabigerovarinic acid, cannabicyclolic acid, cannabielsoic acid, perrottetinenic acid, cannabinolic acid, cannabivarin carboxylic acid, a carboxylate of any one of the preceding molecules, a cannabinoid, tetrahydrocannabinol, tetrahydrocannabivarin, tetrahydrocannabiorcol, cannabidiol, cannabidivarin, cannabidiorcol, cannabichromene, cannabichromevarin, cannabigerol, cannabigerovarin, cannabicyclol, cannabielsoin, perrottetinene, cannabinol, cannabivarin, a naturally-occurring ether of any one of the preceding molecules, a stereoisomer of any one of the preceding molecules; beta-caryophyllene, humulene, (−)-guaiol, (−)-alpha-bisabolol, linalool, alpha-terpineol, caryophyllene oxide, myrcene, eucalyptol, limonene, nerolidol, alpha-terpinene, borneol, (−)-isopulegol, delta-3-carene, para-cymene, or terpinolene.

In some embodiments, the composition lacks cannabis and any chemical species derived from cannabis at a concentration greater than 10 percent by mass. In some specific embodiments, the composition lacks cannabis and any chemical species derived from cannabis at a concentration greater than 1 percent by mass. In some very specific embodiments, the composition lacks cannabis and any chemical species derived from cannabis.

"Cannabis" refers to plants of the genus cannabis and any portion of a plant of the genus cannabis. Cannabis includes, for example, marijuana and industrial hemp.

"Any chemical species derived from cannabis" includes, for example chemical species that are extracted from cannabis and chemical species that are manufactured from cannabis such as by decarboxylating a cannabis extract comprising one or more cannabinoid carboxylic acids.

In some embodiments, the condensed phase comprises biomass of a perennial plant.

In some embodiments, the condensed phase comprises wood.

In some embodiments, the condensed phase comprises sawdust.

In some embodiments, the condensed phase comprises heartwood.

In some embodiments, the condensed phase comprises coniferous wood. In some specific embodiments, the condensed phase comprises *Araucaria*; hoop pine (*Araucaria cunninghamii*); monkey puzzle tree (*Araucaria araucana*); Parani pine (*Araucaria angustifolia*); cedar (*Cedrus*); celery-top pine (*Phyllocladus aspleniifolius*); cypress; Arizona cypress (*Cupressus arizonica*); bald cypress (*Taxodium distichum*); alerce (*Fitzroya cupressoides*); Hinoki cypress (*Chamaecyparis obtusa*); Lawson's cypress (*Chamaecyparis lawsoniana*); Mediterranean cypress (*Cupressus sempervirens*); Douglas fir (*Pseudotsuga menziesii*); European yew (*Taxus baccata*); fir (*Abies*); balsam fir (*Abies balsamea*); silver fir (*Abies alba*); noble fir (*Abies procera*); Pacific silver fir (*Abies amabilis*); hemlock (*Tsuga*); eastern hemlock (*Tsuga canadensis*); mountain hemlock (*Tsuga mertensiana*); western hemlock (*Tsuga heterophylla*); Huon pine (*Lagarostrobos franklinii*); kauri (*Agathis australis*); Queensland kauri (*Agathis robusta*); Japanese nutmeg-yew (*Torreya nucifera*); larch (*Larix*); European larch (*Larix decidua*); Japanese larch (*Larix kaempferi*); tamarack (*Larix laricina*); western larch (*Larix occidentalis*); pine (*Pinus*); European black pine (*Pinus nigra*); jack pine (*Pinus banksiana*); lodgepole pine (*Pinus contorta*); Monterey pine (*Pinus radiata*); Ponderosa pine (*Pinus ponderosa*); red pine (*Pinus resinosa*); Scots pine (*Pinus sylvestris*); white pine; eastern white pine (*Pinus strobus*); western white pine (*Pinus monticola*); sugar pine (*Pinus lambertiana*); southern yellow pine; loblolly pine (*Pinus taeda*); longleaf pine (*Pinus palustris*); pitch pine (*Pinus rigida*); shortleaf pine (*Pinus echinata*); red cedar; eastern red cedar (*Juniperus virginiana*); western red cedar (*Thuja plicata*); coast redwood (*Sequoia sempervirens*); rimu (Dacrydium cupressinum); spruce (*Picea*); Norway spruce (*Picea abies*); black spruce (*Picea mariana*); red spruce (*Picea rubens*); Sitka spruce (*Picea sitchensis*); white spruce (*Picea glauca*); sugi (*Cryptomeria japonica*); white cedar; northern white cedar (*Thuja occidentalis*); Atlantic white cedar (*Chamaecyparis thyoides*); or nootka cypress (*Cupressus nootkatensis*).

In some embodiments, the condensed phase comprises angiosperm wood. In some specific embodiments, the condensed phase comprises abachi (*Triplochiton scleroxylon*); acacia; African padauk (*Pterocarpus soyauxii*); afzelia (*Afzelia africana*); agba (*Gossweilerodendron balsamiferum*); alder (*Alnus*); black alder (*Alnus glutinosa*); red alder (*Alnus rubra*); ash (*Fraxinus*); black ash (*Fraxinus nigra*); blue ash (*Fraxinus quadrangulata*); common ash (*Fraxinus excelsior*); green ash (*Fraxinus pennsylvanica*); Oregon ash (*Fraxinus latifolia*); pumpkin ash (*Fraxinus profunda*); white ash (*Fraxinus americana*); aspen (*Populus*); bigtooth aspen (*Populus gradidentata*); European aspen (*Populus tremula*); quaking aspen (*Populus tremuloides*); Australian red cedar (*Toona ciliata*); ayan (*Distemonanthus benthamianus*); balsa (*Ochroma pyramidale*); basswood; American basswood (*Tilia americana*); white basswood (*Tilia heterophylla*); American beech (*Fagus grandifolia*); birch (*Betula*); gray birch (*Betula populifolia*); black birch (*Betula nigra*); paper birch (*Betula papyrifera*); sweet birch (*Betula lenta*); yellow birch (*Betula alleghaniensis*); silver birch (*Betula pendula*); downy birch (*Betula pubescens*); blackbean (*Castanospermum australe*); blackwood; Australian blackwood (*Acacia melanoxylon*); African blackwood (*Dalbergia melanoxylon*); bloodwood (*Brosimum rubescens*); boxelder (*Acer negundo*); boxwood (*Buxus sempervirens*); Brazilian walnut (*Ocotea porosa*); brazilwood (*Caesalpinia echinata*); buckeye (*Aesculus*); horse-chestnut (*Aesculus hippocastanum*); Ohio buckeye (*Aesculus glabra*); yellow buckeye (*Aesculus flava*); butternut (*Juglans cinerea*); California bay laurel (*Umbellularia californica*); camphor tree (*Cinnamomum camphora*); cape chestnut (*Calodendrum capense*); catalpa (*Catalpa*); Ceylon satinwood (*Chloroxylon swietenia*); cherry (*Prunus*); black cherry (*Prunus serotina*); red cherry (*Prunus pensylvanica*); wild cherry (*Prunus avium*); chestnut (*Castanea*); chestnut (*Castanea sativa*); American chestnut (*Castanea dentata*); coachwood (*Ceratopetalum apetalum*); cocobolo (*Dalbergia retusa*); corkwood (*Leitneria floridana*); cottonwood; eastern cottonwood (*Populus deltoides*); swamp cottonwood (*Populus heterophylla*); cucumbertree (*Magnolia acuminata*); cumaru (*Dipteryx*); dogwood (*Cornus*); flowering dogwood (*Cornus florida*); Pacific dogwood (*Cornus nuttallii*); ebony (*Diospyros*); Andaman marblewood (*Diospyros kurzii*); ebene marbre (*Diospyros melanida*); African ebony (*Diospyros crassiflora*); Ceylon ebony (*Diospyros ebenum*); elm; American elm (*Ulmus americana*); English elm (*Ulmus procera*); rock elm (*Ulmus thomasii*); red elm (*Ulmus rubra*); wych elm (*Ulmus glabra*); eucalyptus; flooded gum (*Eucalyptus grandis*); white mahogany (*Eucalyptus acmenoides*); brown mallet (*Eucalyptus astringens*); southern mahogany (*Eucalyptus botryoides*); river red gum (*Eucalyptus camaldulensis*); karri (*Eucalyptus diversicolor*); blue gum (*Eucalyptus globulus*); rose gum (*Eucalyptus grandis*); york gum (*Eucalyptus loxophleba*); jarrah (*Eucalyptus marginata*); tallowwood (*Eucalyptus microcorys*); grey ironbark (*Eucalyptus paniculata*); blackbutt (*Eucalyptus pilularis*); mountain ash (*Eucalyptus regnans*); Australian oak (*Eucalyptus obliqua*); alpine ash (*Eucalyptus delegatensis*); red mahogany (*Eucalyptus resinifera*); swamp mahogany (*Eucalyptus robusta*); Sydney blue gum (*Eucalyptus saligna*); red ironbark (*Eucalyptus sideroxylon*); redwood (*Eucalyptus transcontinentalis*); Wandoo (*Eucalyptus wandoo*); European crabapple (*Malus sylvestris*); European pear (*Pyrus communis*); tigerwood (*Astronium*); greenheart (*Chlorocardium rodiei*); mpingo (*Dalbergia melanoxylon*); guanandi (*Calophyllum brasiliense*); gum (*Eucalyptus*); gumbo limbo (*Bursera simaruba*); hackberry (*Celtis occidentalis*); hickory (*Carya*); pecan (*Carya illinoinensis*); pignut hickory (*Carya glabra*); shagbark hickory (*Carya ovata*); shellbark hickory (*Carya laciniosa*); hornbeam (*Carpinus*); American hophornbeam (*Ostrya virginiana*); ipê (*Handroanthus*); African teak (*Milicia excelsa*); ironwood; balau (*Shorea*); American hornbeam (*Carpinus caroliniana*); sheoak (*Casuarina equisetifolia*); giant ironwood (*Choricarpia subargentea*); diesel tree (*Copaifera langsdorffii*); Borneo ironwood (*Eusideroxylon zwageri*); lignum vitae; guaiacwood (*Guaiacum officinale*); holywood (*Guaiacum sanctum*); takian (*Hopea odorata*); black ironwood (*Krugiodendron ferreum*); black ironwood (*Olea*); Lebombo ironwood (*Androstachys johnsonii*); Catalina ironwood (*Lyonothamnus floribundus*); Ceylon ironwood (*Mesua ferrea*); desert ironwood (*Olneya tesota*); Persian ironwood (*Parrotia persica*); Brazilian ironwood (*Caesalpinia ferrea*); yellow lapacho (*Tabebuia serratifolia*); jacarandi-boca-de-sapo (*Jacaranda brasiliana*); jacarandi de Brasil (*Dalbergia nigra*); jatobi (*Hymenaea courbaril*); kingwood (*Dalbergia cearensis*); lacewood; northern silky oak (*Cardwellia sublimis*); American sycamore (*Platanus occidentalis*); London plane (*Platanus* x *acerifolia*); limba (*Terminalia superba*); locust; black locust (*Robinia pseudoacacia*); honey locust (*Gleditsia triacanthos*); mahogany; genuine mahogany (*Swietenia*); West Indies mahogany (*Swietenia mahagoni*); bigleaf mahogany (*Swietenia macrophylla*); Pacific Coast mahogany (*Swietenia humilis*); African mahogany (*Khaya*); Chinese mahogany (*Toona sinensis*); Australian red cedar (*Toona ciliata*); Philippine mahogany (*Toona calantas*); Indonesian mahogany (*Toona sureni*); sapele (*Entandrophragma cylindricum*); sipo (*Entandrophragma utile*); tiama (*Entandrophragma angolense*); kosipo (*Entandrophragma candollei*); mountain mahogany (*Entandrophragma caudatumi*); Indian mahogany (*Chukrasia velutina*); Spanish Cedar (*Cedrela odorata*); light bosse (*Guarea cedrata*); dark bosse (*Guarea thompsonii*); American muskwood (*Guarea grandifolia*); carapa (*Carapa guianensis*); bead-tree (*Melia azedarach*); maple (*Acer*); hard maple; sugar maple (*Acer saccharum*); black maple (*Acer nigrum*); soft maple; boxelder (*Acer negundo*); red maple (*Acer rubrum*); silver maple (*Acer saccharinum*); European maple; sycamore maple (*Acer pseudoplatanus*); marblewood (*Marmaroxylon racemosum*); marri (*Corymbia calophylla*); meranti (*Shorea*); merbau (*Intsia bijuga*); mopane (*Colophospermum mopane*); oak (*Quercus*); white oak (*Quercus alba*); bur oak (*Quercus macrocarpa*); post oak (*Quercus stellata*); swamp white oak (*Quercus bicolor*); southern live oak (*Quercus virginiana*); swamp chestnut oak (*Quercus michauxii*); chestnut oak (*Quercus prinus*); chinkapin oak (*Quercus muhlenbergii*); canyon live oak (*Quercus chrysolepis*); overcup oak (*Quercus lyrata*); English oak (*Quercus robur*); red oak; northern red oak (*Quercus rubra*); eastern black oak (*Quercus velutina*); laurel oak (*Quercus laurifolia*); southern red oak (*Quercus falcata*); water oak (*Quercus nigra*); willow oak (*Quercus phellos*); Nuttall's oak (*Quercus texana*); okoume (*Aucoumea klaineana*); olive (*Olea europaea*); pink ivory (*Berchemia zeyheri*); poplar; balsam poplar (*Populus balsamifera*); black poplar (*Populus nigra*); hybrid black poplar (*Populus* x *canadensis*); purpleheart (*Peltogyne*); Queensland maple (*Flindersia brayleyana*); Queensland walnut (*Endiandra palmerstonii*); ramin (*Gonystylus*); redheart, chakte-coc (*Erythroxylon mexicanum*); sal (*Shorea robusta*); sweetgum (*Liquidambar styraciflua*); sandalwood (*Santalum*); Australian sandalwood (*Santalum spicatum*); Indian sandalwood (*Santalum album*); Hawaiian sandalwood (*Santalum ellipticum, Santalum freycinetianum, Santalum paniculatum, Santalum haleakalae*); *Santalum acuminatum; Santalum yasi; Santalum spicatum;* sassafras (*Sassafras albidum*); southern sassafras (*Atherosperma moschatum*); satine (*Brosimum rubescens*); silky oak (*Grevillea robusta*); silver wattle (*Acacia dealbata*); sourwood (*Oxydendrum arboreum*); Spanish-cedar (*Cedrela odorata*); Spanish elm (*Cordia alliodora*); tamboti (*Spirostachys africana*); teak (*Tectona grandis*); Thailand rosewood (*Dalbergia cochinchinensis*); tupelo (*Nyssa*); black tupelo (*Nyssa sylvatica*); tulip tree (*Liriodendron tulipifera*); turpentine (*Syncarpia glomulifera*); walnut (*Juglans*); Eastern black walnut (*Juglans nigra*); common walnut (*Juglans regia*); wenge (*Millettia laurentii*); pangapanga (*Millettia stuhlmannii*); willow (*Salix*); black willow (*Salix nigra*); cricket-bat willow (*Salix alba Caerulea*); white willow (*Salix alba*); weeping willow (*Salix babylonica*); or zingana (*Microberlinia brazzavillensis*).

In some embodiments, the condensed phase comprises biomass of a mute plant. In some specific embodiments, the mute plant is lily of the valley (*Convallaria*), lilac (*Syringa*), honeysuckle (*Lonicera*), violet (*Violaceae*), seringa (*Philadephaceae*), hyacinth (*Hyacinthus*), or sweet pea (*Lathyrus*). In some very specific embodiments, the composition comprises biomass of lily of the valley.

In some embodiments, the boiling point of the molecule at the pressure of the gas phase is at least 10 degrees Celsius greater than the temperature of the gas phase. In some specific embodiments, the boiling point of the molecule at the pressure of the gas phase is at least 20 degrees Celsius greater than the temperature of the gas phase. In some even more specific embodiments, the boiling point of the molecule at the pressure of the gas phase is at least 40 degrees Celsius greater than the temperature of the gas phase. In some very specific embodiments, the boiling point of the molecule at the pressure of the gas phase is at least 100 degrees Celsius greater than the temperature of the gas phase.

Various aspects of the disclosure relate to a method to separate a molecule from an impurity, comprising: providing a composition comprising the molecule and the impurity, wherein the molecule is present in the composition in a solid phase or a liquid phase, and the impurity is present in the composition in a solid phase or a liquid phase; converting the molecule into a vaporized molecule in a gas phase, wherein the gas phase has a pressure and a temperature, the molecule has a boiling point at the pressure and a vapor pressure at the temperature, the pressure of the gas phase is greater than the vapor pressure of the molecule, the boiling point of the molecule is greater than the temperature of the gas phase, and either the impurity lacks a vapor pressure or the impurity has a vapor pressure at the temperature that is less than the vapor pressure of the molecule at the temperature; separating the vaporized molecule from the impurity; and condensing the vaporized molecule into a condensed molecule. Thank you, KB.

What is claimed is:

1. A composition, comprising a gas phase and a condensed phase, wherein:

the condensed phase comprises sawdust;

the gas phase comprises a molecule;

the molecule is furfural;

the condensed phase comprises the molecule;

the gas phase has a temperature and a pressure;

the temperature of the gas phase is greater than 100 degrees Celsius and no greater than 235 degrees Celsius;

the composition has a rate of sensible heat transfer from the gas phase to the condensed phase of at least 2 joules per gram of the condensed phase per second and no greater than 20 kilojoules per gram of the condensed phase per second;

the molecule has a boiling point at the pressure of the gas phase;

the boiling point of the molecule is greater than the temperature of the gas phase;

the molecule has a vapor pressure at the temperature of the gas phase;

the vapor pressure of the molecule is less than the pressure of the gas phase;

the condensed phase consists of one or both of a solid phase and a liquid phase;

the condensed phase is suspended in the gas phase;

the composition comprises at least 1 gram of the condensed phase per cubic meter of the gas phase;

the composition comprises no greater than 1 gram of the condensed phase per liter of the gas phase;

the composition comprises at least 2 micrograms of the furfural per gram of the condensed phase;

the composition comprises no greater than 200 milligrams of the furfural per gram of the condensed phase;

the composition comprises at least 2 micrograms of the furfural per gram of the gas phase;

the composition comprises no greater than 200 milligrams of the furfural per gram of the gas phase;

the composition has an average velocity of at least 100 millimeters per second;

the composition has a turbulent flow; and the condensed phase has a surface-area-to-volume ratio of at least 500 per meter.

2. The composition as claimed in claim 1, wherein:

the composition has a vaporization rate for conversion of the molecule in the condensed phase into the molecule in the gas phase;

the composition has a condensation rate for conversion of the molecule in the gas phase into the molecule in the condensed phase; the composition has a mass transfer rate, which is equal to the vaporization rate minus the condensation rate; and the mass transfer rate is a positive number.

3. The composition as claimed in claim 2, wherein the mass transfer rate is at least 5 micrograms of the molecule per gram of the composition per second.

4. The composition as claimed in claim 2, wherein the mass transfer rate is at least 5 micrograms of the molecule per gram of the condensed phase per second.

* * * * *